(12) United States Patent
Weintraub

(10) Patent No.: US 11,022,226 B2
(45) Date of Patent: Jun. 1, 2021

(54) MICROFLUIDIC VALVE

(71) Applicant: Proserv Operations, Inc., Houston, TX (US)

(72) Inventor: Preston Weintraub, Spring, TX (US)

(73) Assignee: Proserv Operations, Inc., Houston, TX (US)

( * ) Notice: Subject to any disclaimer, the term of this patent is extended or adjusted under 35 U.S.C. 154(b) by 0 days.

(21) Appl. No.: 16/358,145

(22) Filed: Mar. 19, 2019

(65) Prior Publication Data

US 2019/0293196 A1    Sep. 26, 2019

Related U.S. Application Data

(60) Provisional application No. 62/645,658, filed on Mar. 20, 2018.

(51) Int. Cl.
| | | |
|---|---|---|
| *F16K 17/04* | (2006.01) | |
| *G05D 16/10* | (2006.01) | |
| *F16K 99/00* | (2006.01) | |
| *F16K 15/02* | (2006.01) | |

(52) U.S. Cl.
CPC .......... *F16K 17/044* (2013.01); *F16K 15/025* (2013.01); *F16K 17/0493* (2013.01); *F16K 99/0001* (2013.01); *G05D 16/109* (2019.01)

(58) Field of Classification Search
CPC . G05D 16/109; F16K 15/025; F16K 15/0493; F16K 99/0001
See application file for complete search history.

(56) References Cited

U.S. PATENT DOCUMENTS

| | | | |
|---|---|---|---|
| 402,600 | A | 5/1889 | Kemp |
| 1,654,642 | A | 1/1928 | Geissinger |
| 2,140,735 | A | 12/1938 | Gross |

(Continued)

FOREIGN PATENT DOCUMENTS

| | | |
|---|---|---|
| CH | 469928 A | 3/1969 |
| DE | 102014224979 A1 | 6/2016 |

OTHER PUBLICATIONS

PCT International Search Report and Written Opinion dated Nov. 14, 2019, for International Application No. PCT/US2019/046323, 13 pages.

(Continued)

*Primary Examiner* — Angelisa L. Hicks
(74) *Attorney, Agent, or Firm* — Patterson + Sheridan, LLP

(57) ABSTRACT

A valve configured to selectively communicate fluid pressure therethrough includes a valve body having an inlet, an inlet bore extending inwardly of the body from the inlet, a reduced diameter bore, a cam bore, and an outlet bore therein, the outlet bore in fluid communication with the cam bore, and the cam bore including a sloped wall therein extending inwardly on the cam bore in the direction away from the inlet bore, a first piston disposed in the a reduced diameter bore and including a piston passage therethrough fluidly communicating between the inlet bore and the cam bore, a cam disposed in the cam bore and having a self-energizing seal and a lower angled surface engagable against the sloped wall, the self-energizing seal disposed in a seal piston bore therein, and an outlet extending to the exterior of the valve body and opening into the lower angled surface.

16 Claims, 9 Drawing Sheets

(56) References Cited

U.S. PATENT DOCUMENTS

| | | | |
|---|---|---|---|
| 2,311,851 A | 2/1943 | McClure | |
| 2,560,841 A | 7/1951 | Bishop | |
| 2,605,108 A | 7/1952 | Stephens | |
| 2,674,258 A * | 4/1954 | Witter | G05D 16/109 137/211.5 |
| 2,685,296 A | 8/1954 | Boosman | |
| 2,729,226 A | 1/1956 | Jones | |
| 2,799,523 A | 7/1957 | Parker | |
| 2,811,979 A | 11/1957 | Presnell | |
| 2,821,972 A | 2/1958 | Banker | |
| 2,835,271 A * | 5/1958 | Heinrich | G05D 16/109 137/505.13 |
| 2,847,027 A | 8/1958 | Kumpman | |
| 2,862,520 A | 12/1958 | Cordova | |
| 2,867,463 A | 1/1959 | Snider | |
| 2,892,644 A | 6/1959 | Collins | |
| 2,906,290 A | 9/1959 | Harding et al. | |
| 2,973,746 A | 3/1961 | Jupa | |
| 3,022,794 A | 2/1962 | Pippenger | |
| 3,114,391 A | 12/1963 | Kurtz | |
| 3,145,723 A | 8/1964 | Chorkey | |
| 3,189,049 A | 6/1965 | Carlson | |
| 3,219,060 A | 11/1965 | Pearl et al. | |
| 3,225,786 A | 12/1965 | Elliott | |
| 3,279,805 A | 10/1966 | Quinson | |
| 3,316,930 A | 5/1967 | Garduer | |
| 3,345,731 A * | 10/1967 | Parker | B21D 28/34 29/270 |
| 3,352,394 A | 11/1967 | Longshore | |
| 3,421,533 A | 1/1969 | Conn | |
| 3,474,828 A | 10/1969 | Wheeler et al. | |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,587,647 A | 6/1971 | Walters | |
| 3,598,148 A | 8/1971 | Kroffke | |
| 3,635,436 A | 1/1972 | Tillman | |
| 3,662,950 A | 5/1972 | McIntosh et al. | |
| 3,683,694 A | 8/1972 | Granberg | |
| 3,698,427 A * | 10/1972 | Baranowski, Jr. | F16K 1/38 137/542 |
| 3,749,122 A | 7/1973 | Gold | |
| 3,797,525 A | 3/1974 | Lieser | |
| 3,913,620 A | 10/1975 | Pauliukonis | |
| 3,949,645 A | 4/1976 | Masclet | |
| 4,220,174 A | 9/1980 | Spitz | |
| 4,240,634 A | 12/1980 | Wiczer | |
| 4,253,481 A | 3/1981 | Sarlls, Jr. | |
| 4,263,938 A | 4/1981 | Peters | |
| 4,281,677 A | 8/1981 | Hoffman | |
| 4,336,946 A | 6/1982 | Wheeler | |
| 4,387,715 A * | 6/1983 | Hakim | A61M 27/006 604/9 |
| 4,396,071 A | 8/1983 | Stephens | |
| 4,444,216 A | 4/1984 | Loup | |
| 4,475,568 A | 10/1984 | Loup | |
| 4,491,154 A | 1/1985 | Peters | |
| 4,493,335 A | 1/1985 | Watson | |
| 4,554,940 A | 11/1985 | Loup | |
| 4,793,590 A | 12/1988 | Watson | |
| 4,856,557 A | 8/1989 | Watson | |
| 4,877,057 A | 10/1989 | Christensen | |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,222,521 A | 6/1993 | Kihlberg | |
| 5,301,637 A | 4/1994 | Blount | |
| 5,634,491 A * | 6/1997 | Benedict | E03C 1/08 137/504 |
| 5,694,965 A * | 12/1997 | Roulet | G05D 16/109 137/102 |
| 5,771,931 A | 6/1998 | Watson | |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,520,478 B1 | 2/2003 | Hope et al. | |
| 6,523,613 B2 | 2/2003 | Rayssiguier et al. | |
| 6,651,696 B2 | 11/2003 | Hope et al. | |
| 6,668,861 B2 | 12/2003 | Williams | |
| 6,702,024 B2 | 3/2004 | Neugebauer | |
| 6,843,266 B2 | 1/2005 | Hope et al. | |
| 6,901,960 B2 | 6/2005 | Roberts et al. | |
| 6,983,803 B2 | 1/2006 | Watson et al. | |
| 7,000,890 B2 | 2/2006 | Bell et al. | |
| 7,073,590 B2 | 7/2006 | Neugebauer et al. | |
| 7,159,605 B2 | 1/2007 | Thrash, Jr. et al. | |
| 7,438,086 B2 | 10/2008 | Bento et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 | 11/2011 | Numazaki et al. | |
| 8,245,729 B2 | 8/2012 | Zub | |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,453,678 B2 | 6/2013 | Neff et al. | |
| 8,469,059 B1 | 6/2013 | Forst | |
| 8,474,792 B2 | 7/2013 | Kubo et al. | |
| 9,121,244 B2 | 9/2015 | Loretz et al. | |
| 9,297,462 B2 | 3/2016 | Hattori et al. | |
| 9,334,946 B1 | 5/2016 | Mason | |
| 9,354,638 B2 | 5/2016 | Rebreanu et al. | |
| 9,423,031 B2 | 8/2016 | Weintraub et al. | |
| 9,874,282 B2 | 1/2018 | Wetzel et al. | |
| 2004/0047748 A1 | 3/2004 | Roberts et al. | |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2005/0067031 A1 | 3/2005 | Lee | |
| 2006/0137744 A1 | 6/2006 | Anastas | |
| 2006/0237064 A1 | 10/2006 | Benson | |
| 2007/0000544 A1 | 1/2007 | Thompson | |
| 2007/0069576 A1 | 3/2007 | Suzuki | |
| 2007/0113906 A1 | 5/2007 | Sturman et al. | |
| 2009/0211650 A1 * | 8/2009 | Jeon | G05D 16/101 137/488 |
| 2010/0044605 A1 | 2/2010 | Veilleux | |
| 2010/0140881 A1 | 6/2010 | Matsuo | |
| 2010/0154896 A1 | 6/2010 | Thrash, Jr. et al. | |
| 2010/0243084 A1 | 9/2010 | Yoshioka et al. | |
| 2011/0083763 A1 * | 4/2011 | Jeon | F16K 17/105 137/625.64 |
| 2011/0253240 A1 | 10/2011 | Otto et al. | |
| 2012/0292550 A1 | 11/2012 | Meek | |
| 2013/0032222 A1 | 2/2013 | Bresnahan | |
| 2013/0037736 A1 | 2/2013 | Bresnahan | |
| 2013/0146303 A1 | 6/2013 | Gustafson | |
| 2013/0181154 A1 | 7/2013 | Robison et al. | |
| 2014/0116551 A1 | 5/2014 | Smith | |
| 2014/0377111 A1 | 12/2014 | Bagagli et al. | |
| 2015/0060715 A1 | 3/2015 | Hoang | |
| 2015/0152959 A1 | 6/2015 | Mangiagli et al. | |
| 2015/0191996 A1 | 7/2015 | Weintraub | |
| 2015/0191997 A1 | 7/2015 | Weintraub et al. | |
| 2015/0276072 A1 | 10/2015 | Rebreanu et al. | |
| 2015/0276083 A1 | 10/2015 | Druhan et al. | |
| 2015/0369002 A1 | 12/2015 | Patterson | |
| 2016/0103456 A1 | 4/2016 | Cho et al. | |
| 2016/0123478 A1 | 5/2016 | Wetzel et al. | |
| 2016/0230900 A1 | 8/2016 | Schulz et al. | |
| 2016/0258531 A1 | 9/2016 | Ito et al. | |
| 2016/0258537 A1 | 9/2016 | Heiderman et al. | |
| 2016/0312902 A1 * | 10/2016 | Miyake | F16K 1/385 |

(56) References Cited

U.S. PATENT DOCUMENTS

| | | | |
|---|---|---|---|
| 2017/0037984 A1 | | 2/2017 | Frippiat et al. |
| 2017/0097100 A1 | | 4/2017 | Patterson |
| 2017/0175916 A1 | | 6/2017 | Huynh et al. |
| 2017/0189730 A1 | | 7/2017 | Ernfjall |
| 2017/0220054 A1 | | 8/2017 | Zhu et al. |
| 2017/0241563 A1 | | 8/2017 | Simpson |
| 2017/0260831 A1 | | 9/2017 | Green |
| 2017/0314689 A1 | | 11/2017 | Osterbrink et al. |
| 2017/0370481 A1 | | 12/2017 | Glazewski |
| 2018/0073652 A1 | | 3/2018 | Weintraub |
| 2018/0219200 A1 | * | 8/2018 | Albukrek .............. F16K 17/025 |

OTHER PUBLICATIONS

PCT International Search Report and Written Opinion dated Dec. 1, 2017, for International Application No. PCT/US2017/061567.
PCT International Search Report and Written Opinion dated Jan. 31, 2018, for International Application No. PCT/US2017/051550.
PCT International Search Report and Written Opinion dated Jun. 23, 2015, for International Application No. PCT/US2014/062114.

* cited by examiner

MICROFLUIDIC VALVE

CROSS-REFERENCE TO RELATED APPLICATIONS

This application claims benefit of U.S. provisional patent application Ser. No. 62/645,658, filed Mar. 20, 2018, which is herein incorporated by reference.

BACKGROUND

Field

This disclosure relates to the field of valves, more particularly to pressure relief valves and check valves.

Pressure regulation valves, relief valves and check valves are provided to limit the maximum pressure which can be present in a fluid volume, such as a pressure vessel, a flow line or a fluid reservoir, to which the valve is connected. Current pressure relief valves and check valves commonly include a ball which is biased, such as by a spring, against a ball seat which has a generally conical or spherical ball seating surface for receipt of the spherical surface of the ball thereagainst. The seat typically surrounds a passage connected to a further fluid volume, such as a flow line or a fluid reservoir, the upper pressure of which the pressure relief valve is designed to limit or regulate by selectively opening the passage and thereby allow the fluid therein to flow past the seat and the ball when the pressure in the flow line or reservoir exceeds a desired maximum pressure, i.e., the rated opening pressure of the valve, and thereby vent fluid from the flow line or fluid reservoir to reduce the pressure of the fluid therein to the maximum pressure limit thereof or less. The valve outlet is connected to a lower pressure region, such as another enclosed fluid volume, or vented to a lower pressure surrounding/adjacent ambient, including an air ambient surrounding, or when the valve is underwater, a water ambient surrounding. When pressure is exerted on the ball on the side thereof opposite to the spring, i.e., the pressure in the passage, creates a force acting on the ball greater than that of the spring holding the ball against the ball seat (balanced by the ambient pressure on the ball surface not facing the seat), this causes the ball to move away from the ball seat and thus allows the fluid at the passage pressure to flow past the gap created between the seat and ball and thus vent from the passage. Once a high pressure condition in the passage leading to the flow line or fluid reservoir is relieved by allowing the higher pressure fluid to flow through the passage and the gap between the ball and seat and thus outwardly of the flow line or fluid reservoir, the force of the spring overcomes the lower pressure force imposed on the ball from the now lowered fluid in the passage and pushes the ball back onto the seat, re-sealing the passage and thereby closing the valve. Although a spring may be used for biasing the ball against the seat, other mechanisms, such as a fluid pressure, may be used to bias the ball against the seat. Additionally, the valve may be coupled directly to a fluid volume for which it regulates the pressure or provide pressure relief, such as by connection to the sidewall of a pressurized tank for example.

Ball style check valves find common application where fluid overpressure conditions can damage piping and fluid operated components in a fluid circuit, or where fluid pressure is used to switch a fluid operated or other component, using the change or difference in pressure in the passage, flow line or reservoir to effect hydraulic or pneumatic switching of components, such as those in a fluid control circuit.

One issue with ball and seat check valves and relief valves is that they can fail due to contaminants becoming stuck at the ball-seat interface, causing the valve to leak because the ball cannot properly seat on the ball seat to effectively seal off the passage, or contaminants can become engaged with the spring, increasing the stiffness of the spring and increasing the pressure required to move the ball from the seat. Additionally, particulates stuck between the ball and seat can damage the seat or ball surfaces, such as by being temporarily pressed thereinto and after being removed therefrom, leaving a depression in the surface of the seat or ball resulting in a leak path between the ball and seat and thus a leaking valve. This is a particular problem with so called micro valves, where the diameter of the valve body is on the order of less than a centimeter.

SUMMARY

A valve configured to selectively communicate fluid pressure therethrough includes a valve body having an inlet, an inlet bore extending inwardly of the body from the inlet, a reduced diameter bore, a cam bore, and an outlet bore therein, the outlet bore in fluid communication with the cam bore, and the cam bore including a sloped wall therein extending inwardly on the cam bore in the direction away from the inlet bore, a first piston disposed in the a reduced diameter bore and including a piston passage therethrough fluidly communicating between the inlet bore and the cam bore, a cam disposed in the cam bore and having a self-energizing seal and a lower angled surface engagable against the sloped wall, the self-energizing seal disposed in a seal piston bore therein, and an outlet extending to the exterior of the valve body and opening into the lower angled surface.

DETAILED DESCRIPTION

Provided herein are embodiments of a valve construct useful for at least a check valve, pressure relief valve or pressure regulating valve, wherein the sealing elements sealing the valve inlet, or high pressure side, from the valve outlet acting as a vent or low pressure side, slide with respect to one another, to selectively position a cam with respect to an opening in one of the elements to selectively open, throttle or close off fluid communication between the valve inlet and valve outlet and thereby selectively allow, or prevent, passage of fluid from the high pressure inlet, to the lower pressure outlet, of the valve. The sliding seal interface is provided at an adjoining inlet side surface and an outlet side surface, wherein at least one of the one of the inlet and outlet side surfaces slides with respect to the other. In an embodiment, the outlet side surface is operatively connected to the cam, which is also moveable, in the direction between the inlet and outlet of the valve. The cam is configured to move in the direction simultaneously parallel to, and orthogonal to, the long axis of the opening at the sliding surfaces. As the cam moves in these two directions, it causes the outlet side surface of the can to slide along an inlet side surface of a valve component, through which an inlet passage extends. In the closed position, the outlet side surface surrounds the opening of the inlet passage at the inlet side surface. As the cam moves in the direction orthogonal to the direction between the inlet and outlet of the valve while simultaneously moving in the direction between the inlet and the outlet of the valve, it will eventually position the outlet side surface such that at least a portion of the opening of the inlet passage is exposed to the fluid communication path to the outlet of the valve, i.e., not surrounded by the outlet side surface, allowing fluid to pass from the valve inlet to the valve outlet. To maintain the outlet side surface engaged against the inlet side surface, the outlet side surface is provided on the inlet facing end of a piston, which is positioned within a blind bore of the cam, wherein a fluid passage extends through the piston. When the outlet side surface surrounds the inlet passage, the fluid pressure of the inlet communicates through the fluid passage of the piston and thus the base of the blind bore, to bias the outlet side surface against the inlet side surface to prevent the fluid at the inlet pressure from leaking between the inlet and outlet of the valve.

Figure 1:
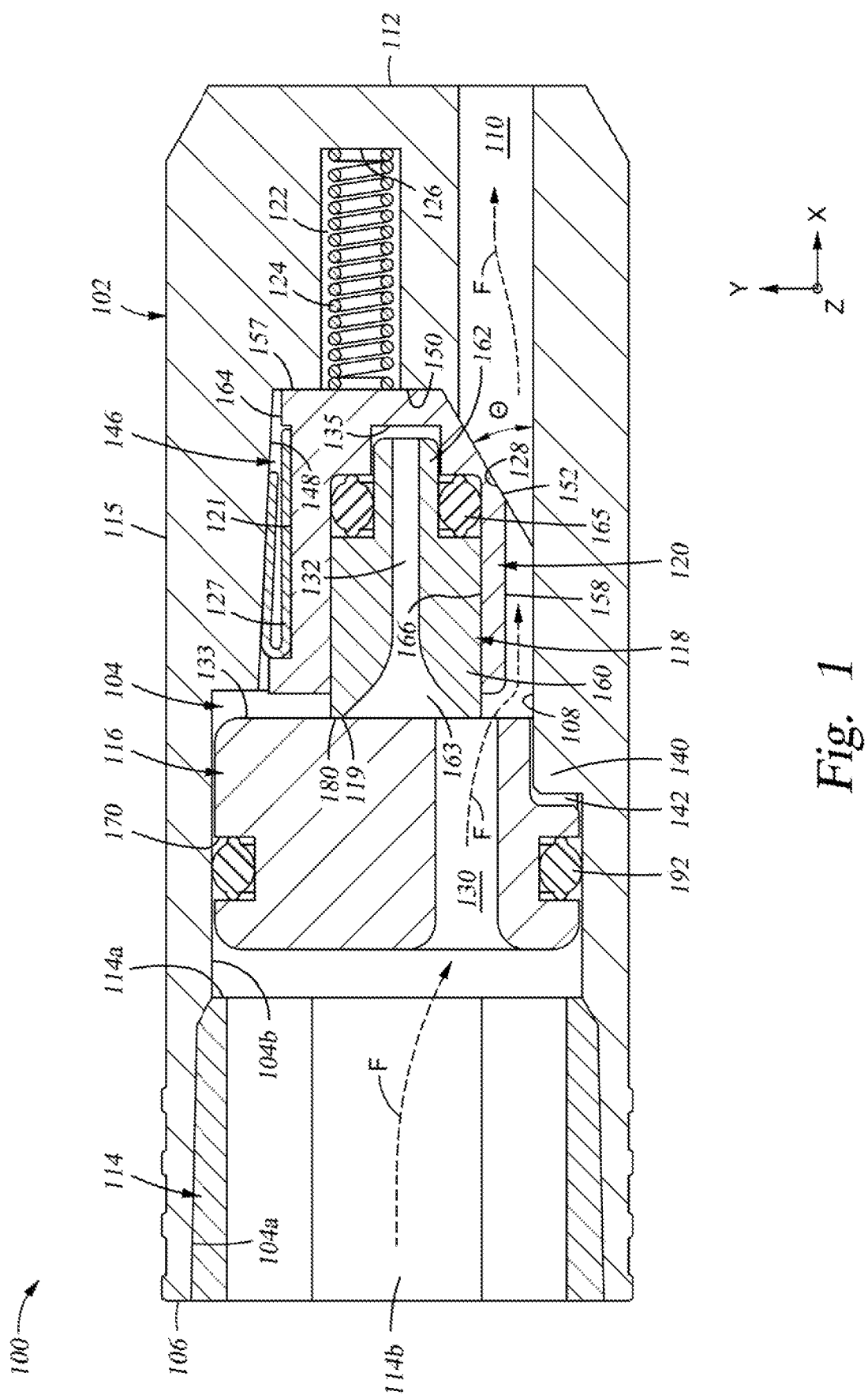
FIG. 1 is a sectional view of an embodiment of the valve hereof in the fully open position, allowing fluid to flow from the inlet side thereof therethrough.
Figure 2:
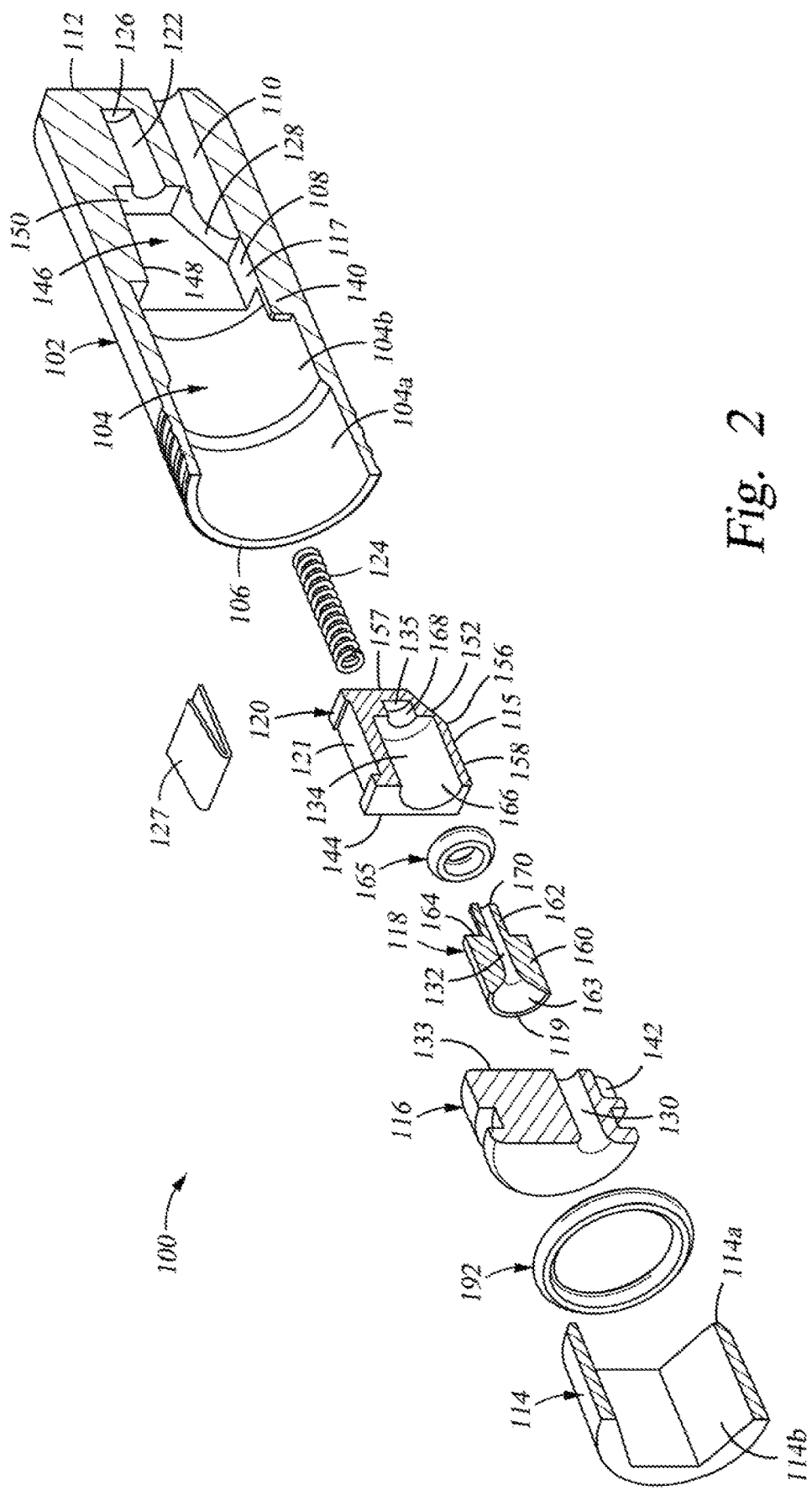
FIG. 2 is an exploded sectional view of the valve of FIG. 1 showing the individual internal components thereof.

Referring to FIG. 1, where a construct of the valve 100 hereof is shown in section, and FIG. 2, where an exploded view of the valve 100 of FIG. 1 is provided, the valve 100 includes a valve body 102 including a major diameter bore 104, forming the inlet port of the valve 100 to be fluidly connected to a fluid component, extending inwardly of a first end 106 thereof, a ramped bore extending 108 inwardly of the valve body 102 from the major diameter bore 104, and a minor diameter bore 110 extending from the ramped bore 108 and through the opposed second end 112 of the valve body 102 and forming the outlet port of the valve 100. Within the valve body 102 are included an inlet adaptor 114 extending inwardly of the first end 106 of the valve body 102, a first piston 116 and a second piston 118 having facing surfaces which together provide an annular sliding sealing surface 180, and a ramped cam 120 disposed in the ramped bore 108 and forming a sliding seal surface therewith. A blind spring bore 122 extends inwardly of the valve body 102, from a location thereof intersecting with the ramped bore 108 and extending therefrom toward the second end 112 of the body 102 generally parallel to minor diameter bore 110 and terminating within the valve body 102, within which a first spring 124 is located and extends between, and contacts, the outlet facing side of the cam 120 and the base 126 of the blind spring bore 122. A second spring 127, here a leaf spring, extends between the surface of the ramped bore 108 and the cam 120, and a portion thereof is retained in a recess 121 extending inwardly of a facing spring receiving surface of the cam 120, wherein the spring 127 continuously biases the cam 120 in the direction of a ramped surface 128 of the ramped bore 108, as the surface 121 against which the second spring 127 bears against the cam 120 is located on the opposite side thereof from the to the ramped surface 128 of the ramped bore 108.

Figure 4:
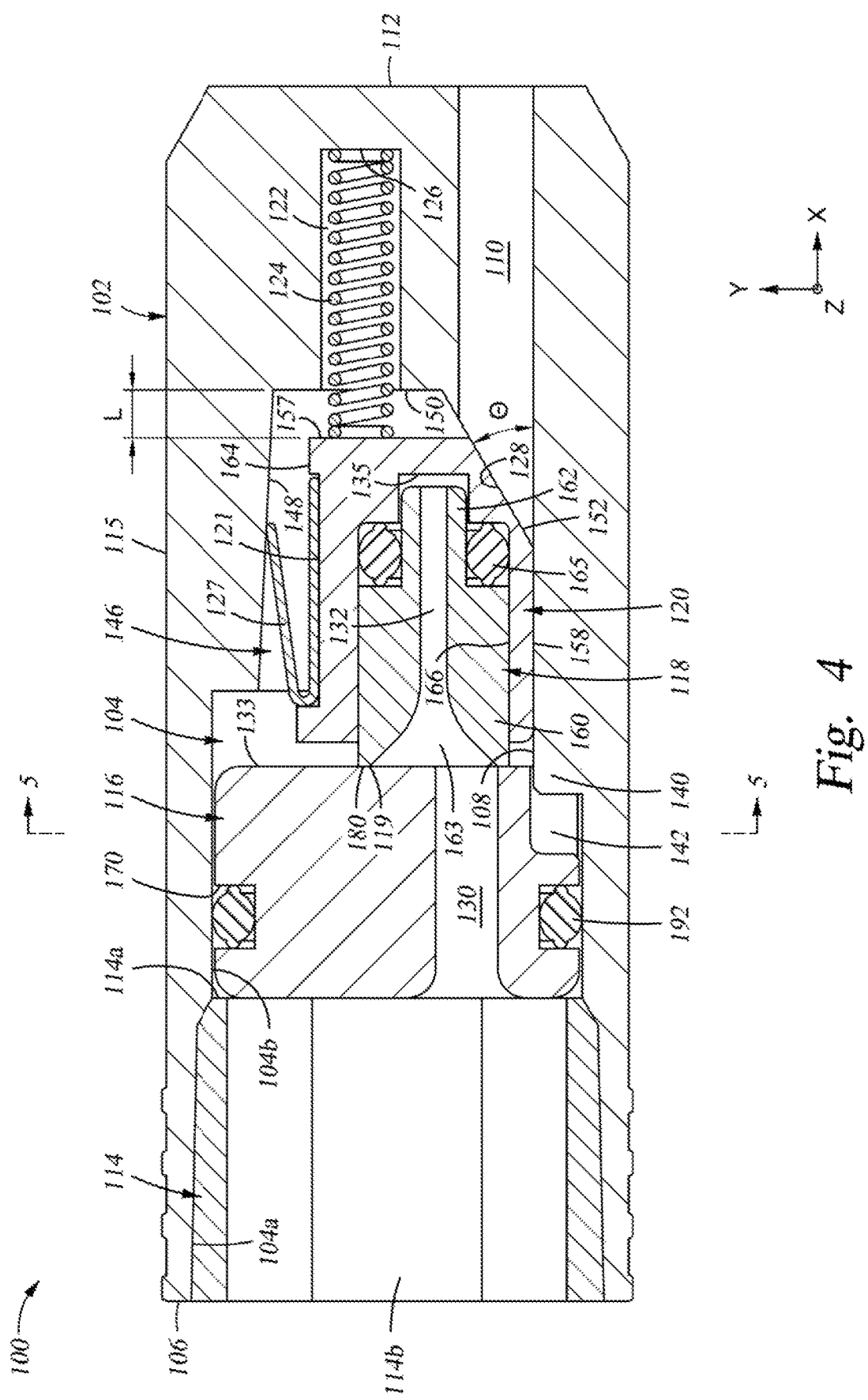
FIG. 4 is a sectional view of the valve of FIG. 1 in the closed position.

First piston 116 includes a bore 130 therethrough in fluid communication with inlet adaptor bore 114b within major diameter bore 104, which, depending on the position of the cam 120 on the ramped surface 128, is selectably sealed off from (FIG. 4), or communicable with (FIG. 1), the minor diameter bore 110. Major diameter bore 104 includes a first portion 104a and a second portion 104b located further inwardly of the first end 106 of the valve body 102 than the first portion 104a thereof, wherein the first portion 104a has slightly larger inner diameter than the second portion 104b. Inlet adaptor 114 is an annular member having a forward wall 114a and an inlet adaptor bore 114b therein, and is disposed within first portion 104a of the valve body 102, such as by being pressed or threaded thereinto, such that the forward wall 114a thereof extends annularly inwardly of the intersection between the first and second portions 104a,b of major diameter bore 104 to provide an annular limit wall to limit movement of the first piston 116 outwardly of the valve body 102 in the direction of the first end 106, i.e., toward the inlet side, thereof. Here, the forward wall 114a is positioned at the inlet end of the second portion 104b of the first bore 104, but this location may be changed, based on the length of the first piston 116 in the X direction of FIG. 1, or other factors, such as the desired amount of movement of the first piston 116 toward the ramped bore 108 before the cam 120 engages against the ramped surface 128, and thus allowing refining the operating characteristics of the valve based on the expected pressure characteristics of a high pressure event fluidly present in the inlet adaptor bore 114b of the major diameter bore 104. Here, as shown in FIG. 4 in the valve 100 fully closed position, the first piston 116 and cam 120 are sized such that the cam ramp surface 152 of the cam 120 is engaged against the ramped surface 128 of the ramped bore 108 when the inlet facing side of the first piston 116 contacts the annular wall 114a of the inlet adaptor 114 and the base 115 thereof contacts the base 117 of the ramped bore 108. Additionally, first portion 104a of major diameter bore 104 is an inwardly tapered bore, but other bore configurations may be used. Thus, the inner terminus of the inlet adaptor 114 inwardly of the inlet side of the body 102, at the forward wall 114b, thereof sets the movement limit of the second piston 118 in the direction toward the inlet side, i.e., the first end, of the valve 100. Here, bore 114b is configured in a hex shape, to receive the end of a hex wrench, for example, an Allen wrench, inwardly thereof to turn the inlet adaptor 114 having threads (threads not shown) on the outer surface thereof to be threaded into, or removed from, the threaded (threads not shown) valve body 102, and to set the position of the annular wall 114b with respect to the second portion 104b. Alternatively, the inlet adaptor can be press fit into the bore 104a, or otherwise secured in the body 102 of the valve 100. The outer surface 115 of the body 100 adjacent first end 106 is configured to be received within a fluid opening extending from, or into, a fluid volume such as a pressure vessel, flow line or reservoir, the maximum pressure of which the valve 100 is configured to limit, by opening, to allow an overpressure condition in the fluid volume to be relieved, and maintained, by closing off fluid communication through the valve 100. The outer surface may be gripped by a clamp or fitting, or may be threaded, to connect it to a fluid passage, flow line or fluid reservoir for which it relieves an overpressure condition.

Second piston 118 likewise includes a bore 132 extending therethrough, and is received within a stepped blind bore 134, having a base 135, in the cam 120. In operation, when a "normal" pressure is present in the bore 114b of the inlet adaptor 114, that pressure is communicated through bore 130 in the first piston, and also fully through the bore 132 in the second piston 118. This pressure, present between the second piston 118 and the base 135 of the stepped blind bore 134 of the cam 120, creates a force tending to push the second piston 118 out of the stepped blind bore 134 of the cam 120 and toward the first piston 116, thereby loading the annular surface 119 of the second piston 118 against the second piston facing end 133 of the first piston 116 to form the annular sealing surface 180 at a location around, i.e., surrounding, the exit of the bore 130 therethrough, and thereby preventing fluid from flowing through the bore 130 and into the minor diameter bore 110 and hence out the valve outlet 136 when the valve 100 is in the fully closed position of FIGS. 4 and 5, and when in the about ready to open position of FIG. 3. Because the annular forward wall 114b limits the movement of the first piston 116 in the valve inlet direction, i.e., in the direction of the first end 106 of the valve body 102, in a normal pressure situation at the inlet and thus in inlet adaptor bore 114b, first spring 124 provides sufficient force to prevent the pressure force on the first piston 116, which is a function of the surface area of the inlet surface 135 of the first piston 116 exposed to inlet pressure across the inlet adaptor bore 114b, from pushing the cam 120 in the direction of the second end 112. Here, where the valve 100 is configured as a pressure regulator to relieve pressure where the reservoir or flowline regulated pressure is on the order of up to 3000 psi, although the second spring 127, in combination with the ramped surface, provides some bias of the cam 120 in the direction of the inlet of the valve 100, the primary force to maintain the valve in the closed position is provided by the first spring 124. Where the valve is used as a check valve, and the opening pressure is on the order of 5 psi, spring 127 alone can be configured to store sufficient energy to close the valve without the need for spring 126.

Figure 3:
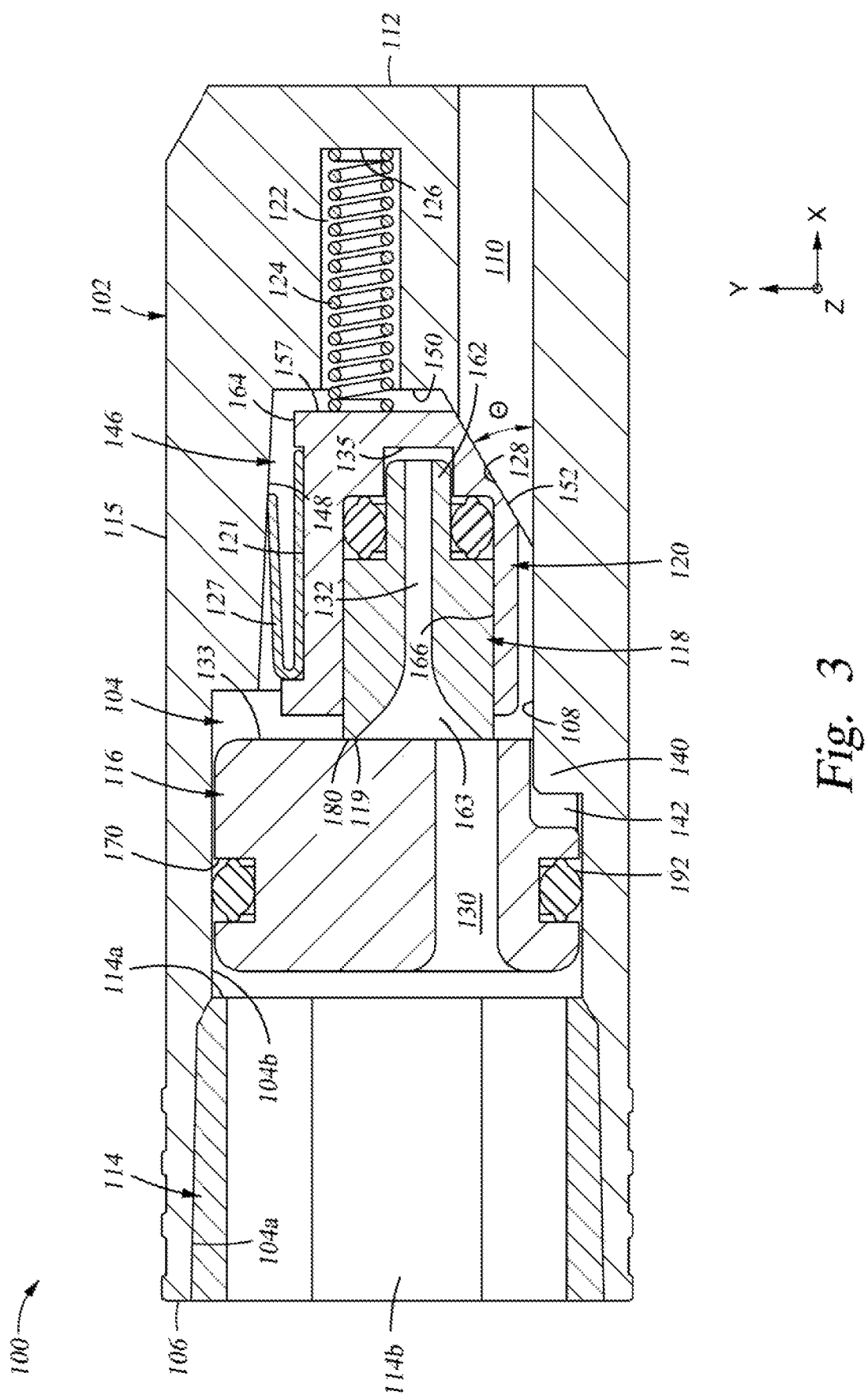
FIG. 3 is a sectional view of the valve of FIG. 1, wherein the valve sealing element is moving toward, or away from, the position thereof sealing of the outlet of the valve.

When an overpressure condition, i.e., a pressure sufficiently greater than the "normal" pressure and thereby requiring relief, or indicating a pressure based control event, is present in inlet adaptor bore 114b, the force of first piston 116 in the direction of the cam 120 resulting from that pressure condition overcomes the countering force of the first spring 124 in the X direction (between the inlet and outlet sides of the valve), or, in the case of a low pressure relief valve, the force of the spring 127, and the first piston 116 begins moving within bore 104b in the X-direction toward the second end 112 of the valve body 102 as shown in FIG. 3 as compared to the position of first piston 116 in FIG. 4. As a result the first piston 116 pushes the second piston 118 with which it is in contact in the X-direction, and because of the pressure in the blind bore equal movement of the cam 120 in the x direction toward the second end 112 of the valve occurs. Because of the presence of the ramped surface 128 of the ramped bore, this causes the cam 120 to slide toward the second end 112 of the valve body 102 along the ramped surface 128 of the ramped bore 108, thereby causing the cam 120 to simultaneously move in the longitudinal direction "X" of the valve body 102, and in the "Y" direction normal thereto against the bias force of the spring 127 to move to the position of FIGS. 3 and 6, where the annular sealing surface 180 of the second piston 118 extends, in part, over the outlet end of the bore 130, the base 119 of the cam moves away from the base 117 of the ramped bore 108, and the bore 130 remains sealed from minor diameter bore 110 and the valve 100 remains closed because the outer circumference of the annular sealing surface 180 is just slightly diametrically outwardly of, or collinear with, a portion of the circumferential wall of bore 130. If the overpressure condition is of a sufficient pressure magnitude, the first piston 116 will continue to push the second piston 118 further inwardly of the valve body 102, causing the cam 120 to move further in the X and Y directions and thereby locate the second piston 118 such that the annular surface 119, or at least the outer circumference of, the second piston 118 biased against the second piston facing surface 133 by second piston 118, will no longer encircle the bore 130 in the first piston 116, and the fluid in the bore 114a of the inlet adaptor inlet adaptor 114 is able to flow through the bore 130 in the first piston 116, through an opening 135 at the outlet end of the bore 130 established by the further movement of the annular sealing surface 180 with respect thereto, and hence out of the valve body 102 through the minor diameter bore 110, allowing the overpressure condition to vent or be relieved by venting fluid though the valve body 102, or to communicate the higher pressure condition to a component fluidly downstream of the minor diameter bore 110 as shown by the arrows F in FIG. 1.

The angle θ (shown only in FIG. 4 for clarity) between the plane of the ramp surface 152 of the cam 120 and the lower surface of a slot 142 in the ramped bore 108 supporting the cam 120 in the valve closed position defines the value of the spring force of the spring 127 tending to bias the cam 120 against the ramped surface 128 in the X-direction, and against the pressure based force acting on the first piston 116 tending to push the first piston 116 toward the rear wall 112 of the valve body 102. However, the primary function of the spring 127 is to supply a bias force to bias the cam 120 into the slot 142 and against the ramped surface 128. This allows the opening area through which the fluid in the bore 130 can flow into the minor diameter bore 110 to be a function of the spring forces of springs 124, 127, primarily first spring 124 and the angle θ of the ramped surface and the effect thereof prevents the cam 120 from immediately fully opening the communication path between bores 130,110, and thus allows the valve 100 to be configured for a desired pressure relief profile therethrough by varying the ramp angle, the size and position of the bores 110, 30, and the spring constants of the springs 124, 127. Thus, as the cam 120 moves from the position thereof in FIGS. 4 and 5, to that of FIGS. 3 and 6 where the bore 130 is just covered by the sealing surface 180 of the second piston 118, to the position in FIGS. 1 and 7 where the maximum fluid pathway opening 135 is formed based on the maximum movement of the cam 120 away from first end 106 of the valve body 102, the springs 124, 127, the angle θ and the pressure in inlet adaptor bore 136 and second bore 110, dictate the movement speed of the cam 120 along the ramped surface 128.

Figure 7:
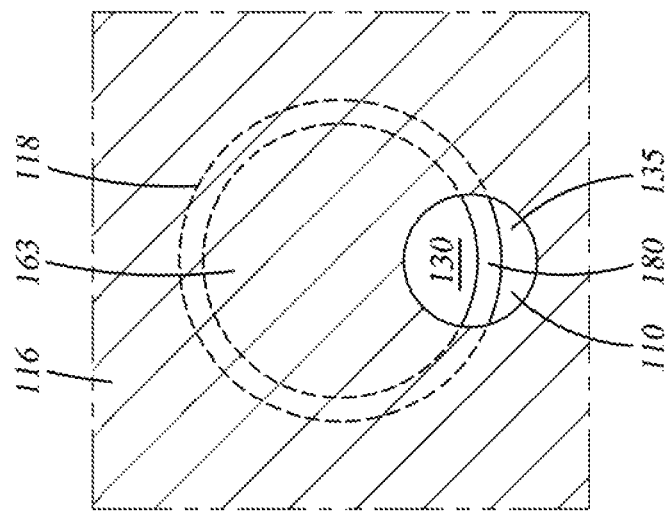
FIG. 7 is an end view of the position of a self-energized sealing surface with respect to the inlet side passage of the valve in the open position of FIG. 1.
Figure 6:
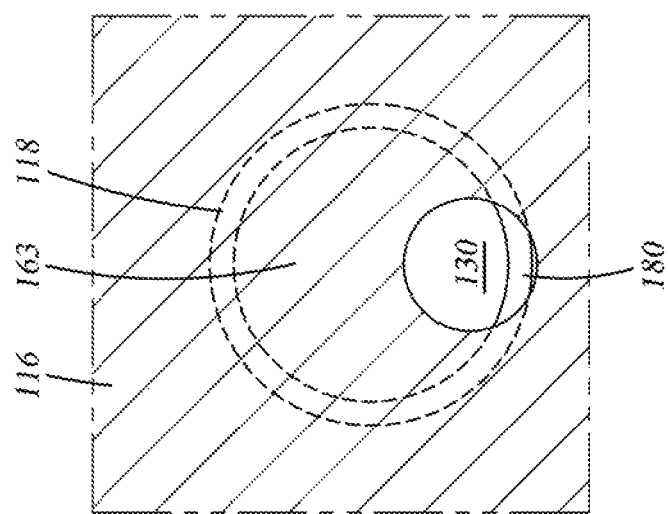
FIG. 6 is an end view of the position of a self-energized sealing surface with respect to the inlet side passage of the valve in the position of FIG. 3.
Figure 5:
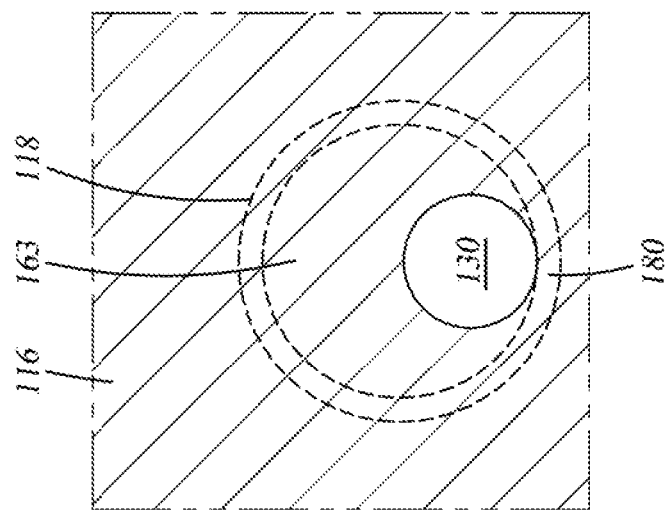
FIG. 5 is an end view of the position of a self-energized sealing surface with respect to the inlet side passage of the valve in the closed position of FIG. 4.

As shown in FIGS. 5 to 7, the location of the sealing surface 180 with respect to the bore 130 changes in the Y direction as the valve 100 opens to relieve an overpressure condition in inlet adaptor bore 136, and closes after the overpressure condition is relieved, is shown. In FIG. 5, the location of the sealing surface 180 of the second piston 118 with respect to bore 130 in the first piston 116 corresponds to the position of the second piston 118 and the bore 130 shown in FIG. 4. Here, the annular sealing surface fully surrounds the bore 130, such that the full, or all of the, annular sealing surface 180 bears against second piston facing end 133 of the first piston 116 to seal off communication of the fluid in the bore 130 with the passage 110. In FIG. 6, the cam 120 and the second piston 118 therein have moved in the Y direction as in FIG. 3, such that a portion of the annular sealing surface 180 passes over the second end 112 facing end of the bore 130, but the bore 130 remains blocked from communication with the passage 110, to maintain the overpressure condition in the inlet adaptor inlet adaptor bore 136 and bore 130. FIG. 7 shows the relative position between the annular sealing surface 180 and the second end 112 facing end of the bore 130 of FIG. 4, where the valve 100 is in the fully open, or full pressure relief, condition of FIG. 1. Here, the outer circumferential surface of the annular sealing surface extends across the bore 130, but leaves a portion of the bore 130 exposed to the minor diameter bore 110, allowing the fluid in the bore 130 to flow through the maximum size of the opening 135 of bore 130 possible to be formed to the passage 110, based on the total possible Y movement of the cam 120, the diameter of the bore 130, and the outer diameter of the annular sealing surface 180. In this flow condition, the pressure drop across the first piston 116 helps maintain the first piston 116 biased against the annular sealing face 180 of the second piston 118. When the overpressure condition in inlet adaptor bore 114b is insufficient to compress the first spring 124 to the extent greater than that occurring thereto with respect to FIG. 1, the spring 124 pushes the cam 120, and thus the second piston 118 therein, in the direction of inlet adaptor bore 114b, and spring 127 simultaneously pushes cam 120 to slide to position the annular sealing face 180 of the second piston 118 in a location sealing off bore 130 from fluid communication therethrough, i.e., the position of FIG. 3. Then, if the pressure is low enough in the inlet adaptor bore 114b, the first spring 124 pushes the cam 120, and thus the second piston 118 therein, further in the direction of inlet adaptor bore 114b, and spring 127 simultaneously pushes cam 120 to slide along ramped surface 128 to position the annular sealing face 180 of the second piston 118 at a location fully surrounding the outlet of bore 130 at second piston facing surface 133 of first piston 116, as shown in FIG. 4.

The maximum area of the opening 135 as shown in FIG. 7 is a function of the angle θ, the maximum distance between the rear surface 157 of the cam 120 when the cam 120 has engaged the ramped surface 128 and has not begun sliding therealong and the rear wall 150 of the second piston bore 182, here distance "L", the diameter of bore 130 and the outer diameter of the annular sealing surface 180. The maximum distance that the outer circumference of the annular sealing face 180 can move in the Y direction is L tan e. Thus, the maximum distance that the outer circumference of the annular sealing face 180 can move in the Y direction is a function of the angle θ. Additionally, the rate at which the area of the bore 130 communicating with the minor diameter bore 110 can increase during an overpressure condition in inlet adaptor inlet adaptor bore 136 is a function of the angle θ, the difference between the pressure force on the first piston and the opposing force supplied by springs 124, 127, the outer circumferences of the annular sealing face 180 and the circumference of the bore 130. This gives the designer of the valve 100 substantial freedom to configure the valve components, particularly the spring constants of the springs 124, 127, the ramped surface angle θ, and the relative sizes of the bore 130 and annular sealing surface 180 to obtain a desired valve response for anticipated pressure conditions in the inlet adaptor bore 136. Additionally, the bore 130 and the annular sealing surface 180, need not be circular in section. Other cross-sections, for example a crescent shaped cross-section, can be employed, wherein the lower side of the opening of the bore 130 corresponds in curvature to the curvature of the outer circumference of the annular seal surface 180. Likewise triangular, square, ovoid and polygon shaped bore 130 openings can be provided. Also, the ramp surface 128 need not be a flat plane as shown in the Figures, but instead the ramp surface can be a convex or concave shape, depending on the valve designers needs to control pressure in a specific application.

Once the overpressure condition has been ameliorated and the pressure in the inlet adaptor bore 136 is returning to normal, the force of the first spring 124 is sufficient to overcome the fluid pressure based force of the piston pressing the cam 120 against it, and the first spring 124 begins pushing the cam 120 in the direction of the first end 106 of the body 102, and the second spring 127 pushes against the cam 120 to maintain it in contact with the ramped surface 128, causing the annular sealing surface 180 of the second piston 118 to surround the opening of the inlet adaptor bore 130 in the first piston 116 and sealing it off from fluid communication with the minor diameter bore 110, thereby closing the valve as shown in FIG. 1.

For the valve to properly operate, the bore 130 in the first piston 116 must remain in a specified location with respect to the second piston 118, to properly align the bore 130 with respect to the annular sealing surface 180 to allow the valve 100 to operate properly. To facilitate this, as best shown in FIG. 2, the portion of the major diameter bore 104 within which the first piston 116 is located 182 is configured having a key 140 functioning an anti-rotation feature for the first piston 116, and the first piston 116 includes, extending inwardly of the outer circumference and second piston facing side 133 thereof, a key slot 142 oriented with respect to the location of the key 140 and the bore 130 to ensure proper alignment of the bore 130 with respect to the annular sealing surface 180 to allow the valve 100 to operate properly. Here, the center of the key slot 142 in the circumferential direction of the outer surface of the first piston 116, and the longitudinal centerline of bore 130, are both on a plane extending along, and projecting from, the centerline of the first piston 116, where the bore 130 is located between the centerline of the first piston 116 and the key 140, to ensure this alignment. The key slot 142 slides over the key 140, to maintain the circumferential orientation of the first piston 116, and the bore 130 therethrough, in the same position as it moves longitudinally in the major bore 104. Although a single continuous key 142 is shown, two or more keys, aligned with each other in a direction parallel to the centerline of the bore 118 may be used, or other key and key slot arrangements, wherein the key slot is positioned with respect to the bore 130 to ensure proper alignment between the bore 130 and the annular sealing face 180 of the second piston 118, may be used.

The valve 100 of FIGS. 1, 3 and 4 is shown in section in FIG. 2, and the plane of the section bisects the valve, and the remainder of the valve is a mirror image to that shown in FIG. 2. Herein, major diameter bore 104 and minor diameter bore 110 are generally circular in cross section, whereas ramped bore 108 is generally rectilinear in construct and includes opposed parallel side walls 146 (only one shown) an upper wall 148 and the ramped surface 128 leading to rear wall 150. Cam 120 is likewise rectilinear, and includes opposed, parallel, side walls, an upper surface 164, a rear surface 157, and a lower cam ramp surface 152. The distance between the side walls 144 of the cam 120 is slightly less than the distance between opposed side walls of the ramped bore 108, allowing the cam 120 to move freely in the cam bore in the X and Y directions without cocking or jamming therein, and maintaining its alignment with respect to second piston facing side 133 of the first piston, such that their facing surfaces maintain a substantially parallel relationship with one another. Likewise, second piston 118 is sized to closely fit, without binding, within the right cylindrical first sub bore 166 extending inwardly of the first piston facing end of the cam 120, and a minor diameter right cylindrical second sub bore 168 extending therefrom to the base 135 of the blind bore 134, which maintains the annular surface 180 of the second piston 118, and the second piston facing surface 133 of the first piston, parallel to one another, in a self-correcting fashion. I.e., there is enough play in the connections such that the annular surface 180 of the second piston 118 and the second piston facing surface 133 of the first piston 116 can self-align into a parallel sealing relationship. Here, ramped surface 128, and a corresponding cam ramp surface 152 in contact therewith, are both flat. However, other surface configurations, such as upwardly curving ramp surfaces 128, 152 may be employed. As such, surfaces sliding with respect to each other open and close the outlet to the valve 100, here minor diameter bore 110, and the close contact therebetween ensured by the bias of spring 127 ensures that particulates are not maintained at the sliding contacting sliding seal surfaces during movement of the cam 120, and thereby disrupt the sealing ability of the valve 100. The lower surface 158 of the cam 120 extending in the inlet direction of the valve 100 from the ramped surface 152 forms a wiping surface 156 where they join, which pushes particulates forward of it as the cam 120 moves toward the inlet adapter bore 114a as the valve is closing. Additionally, the intersecting portion where the rear surface 157 and ramped surface 152 of the cam intersect also form a wiping surface to prevent particulates from getting between the ramp surface 128 and ramped surface 152 as the valve is opening. The upper surface 148 is generally flat, i.e., planar, and may be configured to slope inwardly of the cam bore from the inlet to outlet sides of the valve 100. Where this slope is provided, as the cam 120 moves inwardly of the cam bore and up the ramped surface 128, the spring 127 on the upper surface 164 of the cam likewise moves in the same direction by the same amount, and is pushed upwardly in the direction of the upper 148 of the cam bore the same distance as the cam 120, compressing the spring. Additionally, where the inward slope is provided, the spring 127 is compressed more that the Y direction movement of the cam 120 along the ramped surface 158 provides, thereby increasing the stored energy on the spring and further increasing the bias of the cam 120 against the ramped surface 128.

In order to effectively seal off communication through the valve when operating under normal operating pressures, fluid in the bore 132 in the second piston 118 cannot leak to the minor diameter bore 110. Here, referring to FIG. 2 for clarity, the second piston 118 includes a first right cylindrical portion 160, a second, smaller in diameter, right cylindrical portion 162 extending from the first right cylindrical portion 160 in the direction of the base 138 of the blind bore 134 in the cam 120, and an annular wall 164 extending therebetween. The blind bore 134 in the cam 120 includes a major diameter right cylindrical first sub bore 166 extending inwardly of the first piston facing end of the cam 120, and a minor diameter right cylindrical second sub bore 168 extending therefrom to the base 135 of the blind bore 134. The length or depth of the second sub bore 168 is less than the length of the second right cylindrical portion 162 extending between the annular wall 164 and the end 170 thereof. A seal 165, here a key seal, is received between the second right cylindrical portion 162 and the first sub bore 166 and is in sealing contact with the surface of both. Thus, fluid passing through the bore 132 of the second piston 118 is prevented from leaking out between the surfaces of the first sub bore 166 of the cam and the first right cylindrical portion 160 of the second piston. Additionally, to prevent fluid leaking past the outer circumference of the first piston 116, the outer circumference thereof includes a circumferential seal groove 170 extending inwardly thereof, a seal 192, for example an O-ring, is located therein and seals between an inner surface of the seal groove 170 and the circumferential surface of the bore 104b. The compressed seal ring 192 also helps center the first piston 116 in the bore 104b.

The bore 162 extending through the second piston 118 includes, at the first piston facing end thereof, a funnel shaped opening 163 such that the bore tapers inwardly along a curve for approximately one fifth of its length, and thereafter maintains the same diameter. The funnel shaped opening 163 portion opens at the first piston annular wall 119 facing the second piston 118 to form the inner diameter of the annular sealing face 180, and the diameter of the opening at the annular sealing face is approximately 1.5 to 2 times the diameter of the bore 130 in the first piston 116.

Figure 8:
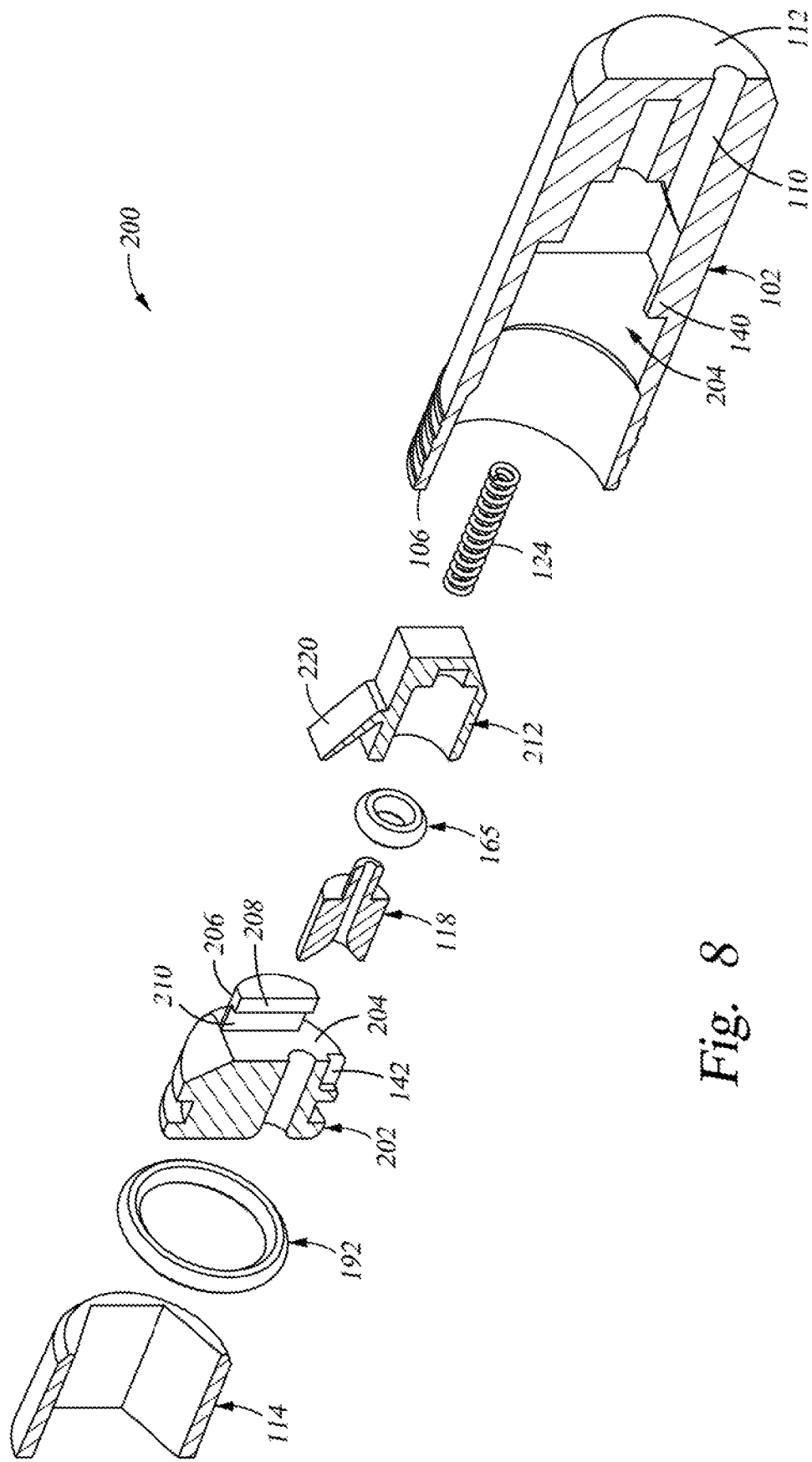
FIG. 8 is an exploded view of an alternative embodiment of the valve of FIG. 1, with the components thereof shown in section.
Figure 9:
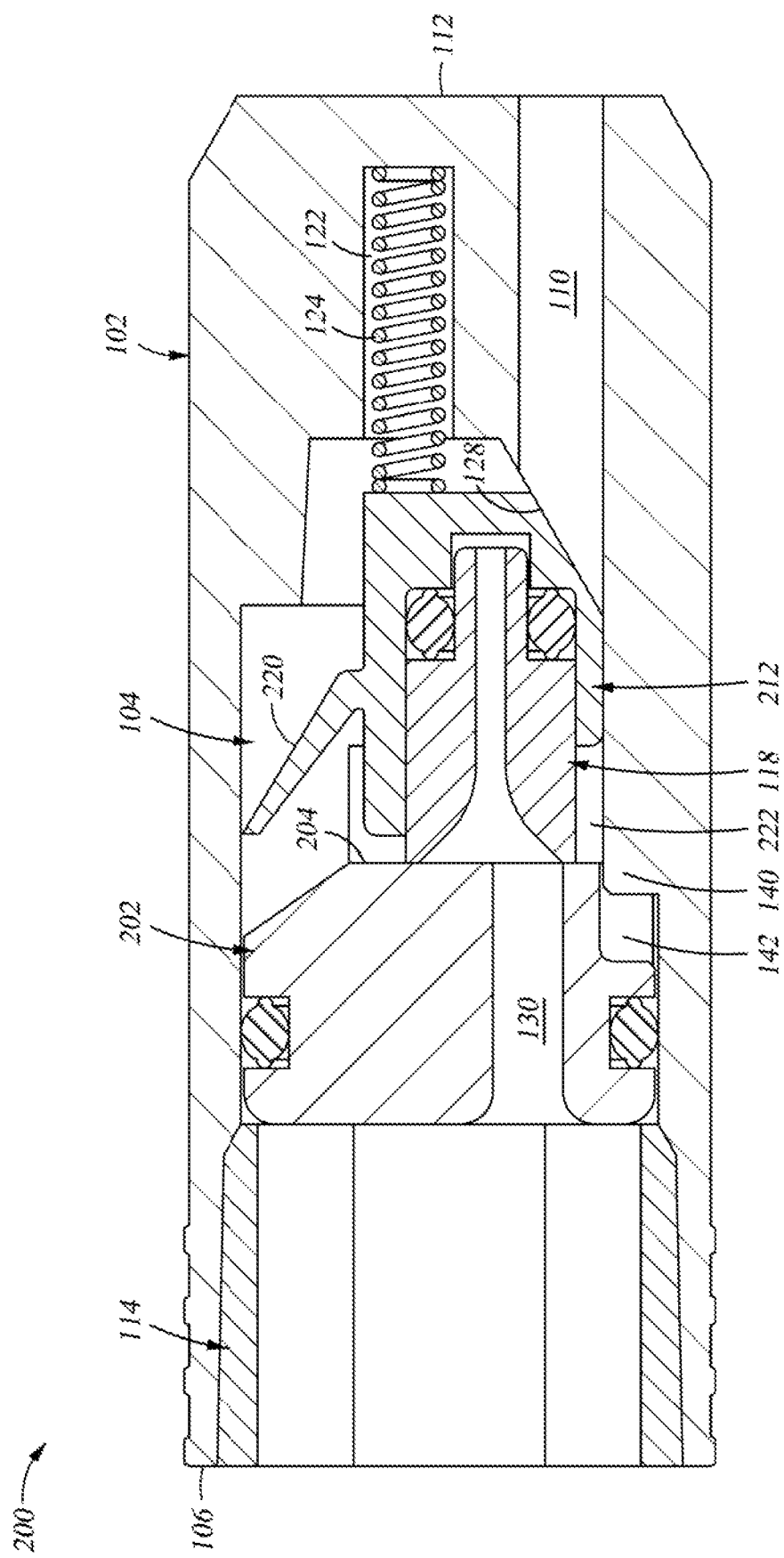
FIG. 9 is an assembled view of the exploded view of the valve of FIG. 8.
Figure 10:
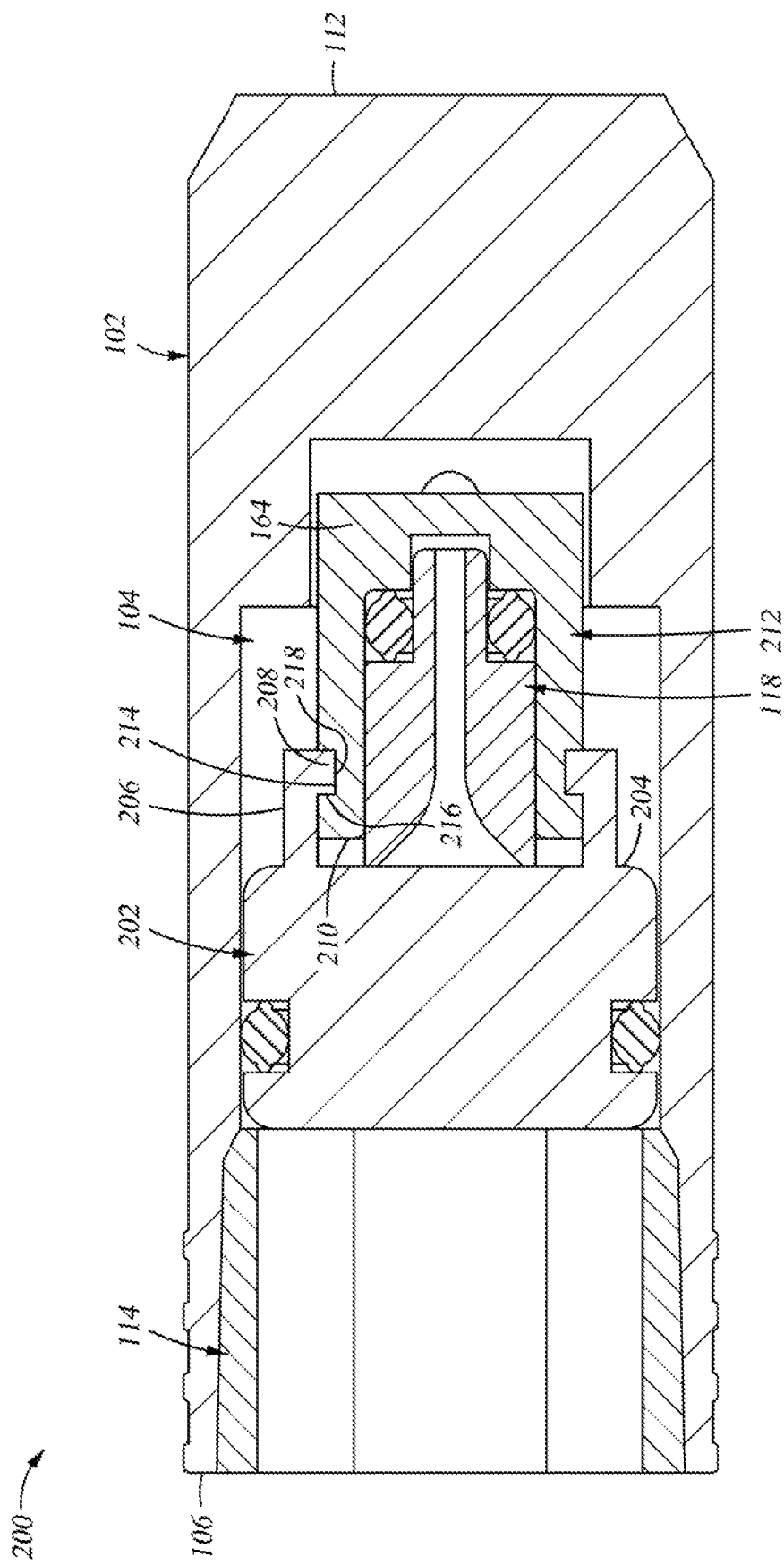
FIG. 10 is a sectional view of the valve of FIG. 9 rotated by 90 degrees about the longitudinal axis thereof.

An alternative embodiment of the valve 100, here valve 200, is shown in FIGS. 8 to 10, wherein first piston 202 is modified as compared to first piston 116, such that the second piston 116 and thus cam facing side 204 thereof includes a pair of "L"-shaped extensions, only one shown in FIG. 8, extending in the direction of the cam 212 of the valve 200. In all other respects the valve and its internal features and elements are the same as those discussed previously herein, and the features will not be repeated herein.

Here, each "L"-shaped extension includes a standoff 206 extending from and generally perpendicular to the cam facing side 204 of the first piston 202, and, at the end thereof distal of the cam facing side 204, an inwardly extending ledge 208, such that a guide slot 210 extends from the ledge 208 to the cam facing side 204 of the second piston 202 along the standoff 206. Cam 212 is identical to cam 120 of FIGS. 1 to 4, except in includes, on opposite sidewalls thereof, a groove 214 extending thereacross in a direction parallel to the Y direction movement of the cam 212, which groove 214 is bounded by first wall 216 and a second wall 218 (FIG. 10) and an integral spring 220. The depth of the grooves 214 inwardly of the sidewalls of the cam 212 is slightly greater than the height of the ledge 208 of the first piston from the standoff 206, i.e., slightly greater than the depth of the guide slot 210. The ledges 208 of the first piston extend inwardly of the grooves 214 in the cam 212. A relief slot 222, formed by limiting the extension of a portion of the cam 212 toward the first piston 202, is provided to allow the cam 212 to slide into the guide slot 210.

Cam 212 also includes an integral spring 220, extending from the side thereof opposed to the cammed surface, in the embodiment, configured as a leaf spring. Spring 220 is configured to provide the same function as spring 127 of the first embodiment, and spring 124 of this alternative construct serves the same purpose as in the first construct.

Alternatively, where the valve 200 is configured as a check valve, spring 220 may be configured to provide all of the force needed to bias the cam 212 against the ramped surface, eliminating the need for blind spring bore 122 and spring 124, and, when the valve 200 is in the closed position (the position of the cam of FIG. 4) maintain the cam 212 such that it is not moved toward the center of the valve body along the ramped surface, and, after a venting event to vent excess pressure form the inlet side of the valve, overcome the force of the inlet side pressure on the first piston 202 to push the cam 212 down the ramped surface 128 against that pressure and close off communication between inlet adaptor bore 104*b* and the minor diameter bore 110 and close the valve 200.

Here, during movement of the first piston 202 toward, and away from, the second end 112 of the valve 200, the portion of the cam 212 forward of the sidewall 216 thereof extends inwardly of the guide slot 210, and the ledge 208 of the first piston 202 extends inwardly of the groove 214 in the cam 212. As a result, as the first piston 202 loads against the second piston 212 in an over pressure event at the inlet adaptor bore 104*b*, it causes the cam 200 to move toward the second end 112 of the valve body 102 as the cam slides along the ramped surface 128 in the X and Y directions, to expose the bore 130 of the second piston 202 to the minor diameter bore 110. The groove 214 and guide slot 210 arrangement maintain the cam 212, and thus the second piston 118 and the annular sealing surface 180 thereof in the proper orientation to maintain the annular sealing surface 180 of the second piston 118 parallel to, and against, the second piston facing surface 133 of the first piston 202, and properly aligned with the bore 130 of the first piston 202. The key 140 and key slot 142 ensure the proper alignment of the first piston 202, and thus the cam 212, with respect to the ramped surface 128 and the minor diameter bore 110. In one aspect of this construct, the need for sidewalls of the cam bore to maintain the cam 120 to first piston 116 alignment of the first embodiment herein is eliminated and the construction of the cam bore is simplified. Additionally, it ensures that the first and second pistons 202, 118 are maintained closely adjacent to each other, such that the pressure seal of the annular sealing face 180 against the outlet facing surface 133 of the first piston 202 will be maintained, i.e, the cam 212 and the first piston 202 cannot pull away from each other. If the guiding sidewalls of the cam bore are not provided, the key 140, and key slot 142 in the first piston 202, maintain the alignment of the ramped surface 152 of the cam 212 to the ramped surface 128 of the ramped cam bore. Likewise, when the over pressure condition is relieved, and the first piston moves in the direction away from the second end 112 of the valve body 102, the cam 212 is pulled in the same direction by the groove 214 and guide slot 210 arrangement, and the camming ramped surfaces of the cam and body are maintained in contact by force supplied by the integral spring 220 bearing on the upper surface of the cam slot.

The components of the valves 100 and 200 other than the springs 112, 126 may be made from peek or a graphite filled plastic, and can be machined, molded, or a combination of machined and molded. Alternatively, the components can be manufactured from a corrosion resistant metal such as stainless steel, or some of the components may be made of a peek or graphite filled plastic, and others of a corrosion resistant metal.

Where the valve 100, 200 is used only as a pressure relief valve, the second end 112 of the valve need not be connected to another component, so that the pressure on the outer surface, and thus in passage 130, can vent to the local ambient pressure where the valve is installed. Alternatively, the minor diameter bore 110 can include threads along the inner circumference thereof adjacent to second end 112 of the valve 100, 200, for threaded receipt of a coupling therein, or a coupling or conduit can be press fit therein where no threads are provided.

Figure 11:
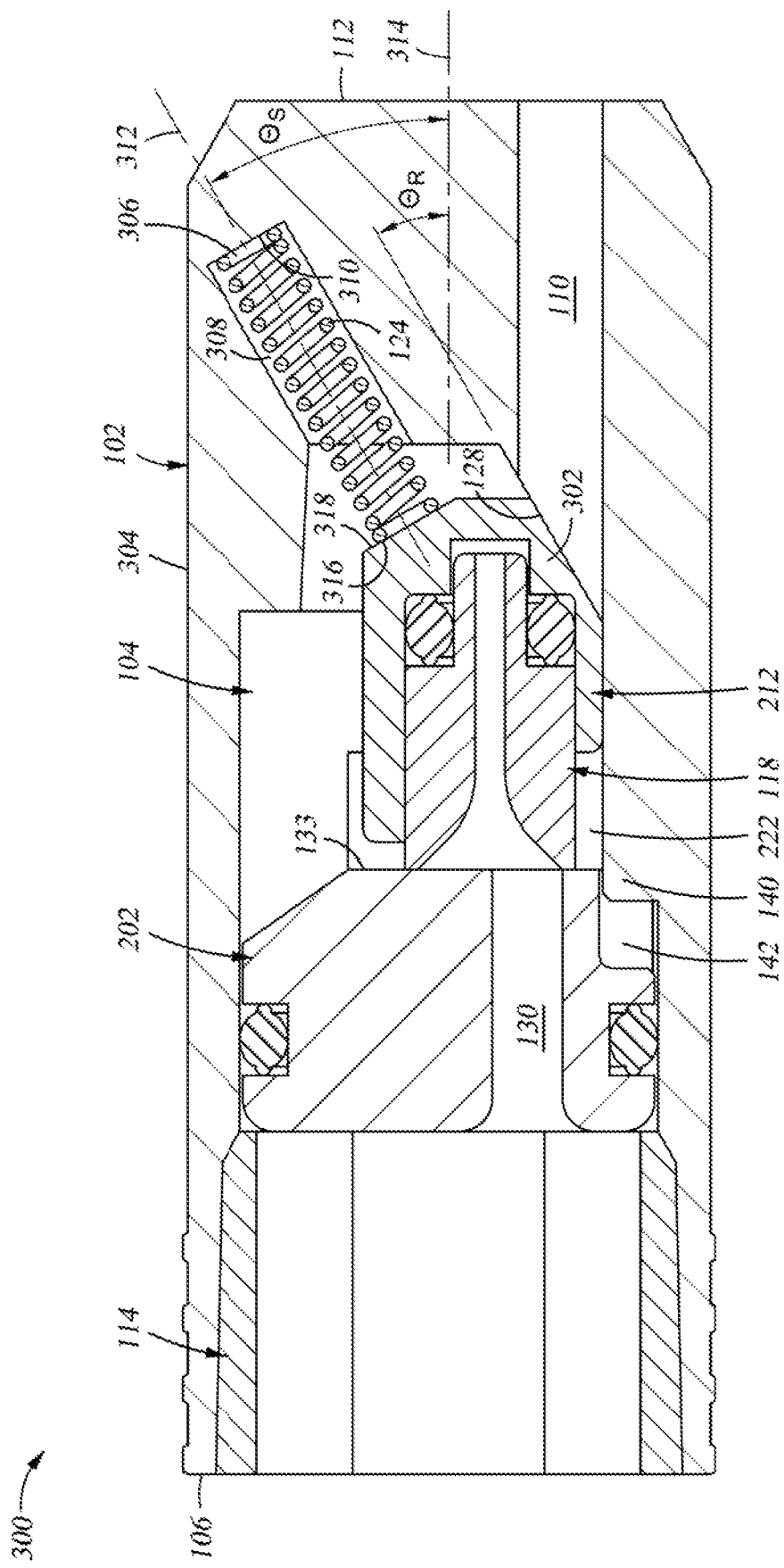
FIG. 11 is a sectional view of a further alternative embodiment of the valve of FIGS. 8 to 10.

Referring now to FIG. 11, a second alternative embodiment of the valve is shown, here valve 300, wherein the valve 200 of FIGS. 8 to 10 hereof is modified, such that only a single spring is provided to close the valve or maintain it in the closed position and maintain the cam against the ramped surface 128 of the valve body. In other respects, the valve 300 is configured the same as Valve 200.

Valve 300 includes a valve body 304 including the bore 104, ramp bore 108, first and second pistons 202, 118, and a modified cam 302. Here, one end of a single spring 306 is received in a blind spring bore 308 and is limited in movement thereinto by blind bore base 310, wherein the blind spring bore centerline 312 forms a first angle eS with the centerline 314 of the valve body 301. The cam 302 is modified with respect to the cam of FIGS. 8 to 10 in that the rear surface thereof includes a chamfered wall 316 which is substantially parallel to blind bore base 310, and against which the end of the spring 306 extending outwardly of the blind spring bore 308 contacts. Here, as the cam 302 moves away from the first end 106 of the valve during an overpressure condition at bore 104, the cam end 318 of the spring 306 slides along chamfered wall 316 and maintains contact therewith. Thus, only one spring is employed, and spring 124 is not required.

The angle between the ramped surface 128 of the valve body and the centerline 314 of the valve body 304 is eR, which is smaller than the angle eS. Thus, the spring 306 is configured to push the cam 302 both against the ramped surface 128 and thus maintain the cam 302 thereagainst as it slides therealong, and simultaneously push cam 302 toward the first end 106 of the valve body 304 and thereby maintain the annular sealing surface 180 of the second piston 118 against the outlet facing surface 133 of the first piston 202. Thus, a single spring, here spring 306, is provided to maintain the valve in the closed state when normal pressure is present in the bore 104, maintain the annular sealing surface 180 of the second piston 118 against the outlet facing surface 133 of the first piston 202 even as the first piston 116 moves toward the minor diameter bode 110 during an overpressure condition in the bore 104, and restore the valve to the closed condition when the overpressure condition is relieved. The configuration of valve 300 is useful as both a pressure relief valve where the valve must seal against pressures of up to, for example 300 psi between bore 104 and the outlet end of minor diameter bore 110, as well as check valve applications where a pressure difference on the order of 5 psi is normally present.

The valves 100, 200 and 300 hereof are useful in any application wherein a high pressure occurrence in a flow line or reservoir need be communicated therefrom, either to relieve that high pressure condition where it is an overpressure condition, or to allow the higher pressure to be communicated through the valve 100 to a downstream component. Additionally, the valve construct herein is particularly useful for micro valves, wherein the diameter of the valve is on the order of one to three cm in diameter, where the operating fluid that the bore 106 and inlet adaptor 114 are exposed to is dirty, i.e., it contains particulates that would cause the ball to not seat on the seat thereof in a normal ball-ball seat style valve. Here, because the movements of the valve to allow relief of the pressure in the inlet adaptor are all sliding movements, where the sliding components are in contact, and remain in contact, throughout the service life of the valve, there are no gaps where particulates can lodge and maintain the valve in an open condition. Additionally, the sealing of the bore 130 having the pressure of the reservoir or flowline being potentially relieved by the valve 100 is self-energized by the pressure maintained between the base 138 of the blind bore 134 of the cam 120 and the facing surfaces of the second piston 118, the annular sealing surface 180 will maintain sealing against the adjacent surface of the first piston at all operating and overpressure conditions. Additionally, because the fluid present between the base 138 of the blind bore 134 of the cam 120 and the facing surfaces of the second piston 118 is stagnant, i.e., it is not flowing once the valve 100 is installed into a fluid circuit, particulates are not introduced into the space between the second piston 118 and the bore therefor, and thus the second piston will not bind in its bore.

What is claimed is:

1. A valve configured to selectively communicate fluid pressure therethrough, comprising:
    a valve body having an inlet, an inlet bore extending inwardly of the body from the inlet, a reduced diameter bore, a cam bore, and an outlet bore therein, the outlet bore in fluid communication with the cam bore, and the cam bore including a sloped wall therein extending inwardly on the cam bore in the direction away from the inlet bore and the outlet bore intersecting the sloped wall and opening through the sloped wall;
    a first piston disposed in the a reduced diameter bore and including a piston passage therethrough fluidly communicating between the inlet bore and the cam bore;
    a cam disposed in the cam bore and having a self-energizing seal and a lower angled surface engageable against the sloped wall to slide therealong, the self-energizing seal disposed in a seal piston bore therein and the lower angled surface of the cam positionable in a first position where the lower angled surface extends fully across the opening of the outlet bore through the sloped wall, and a second position wherein the lower angled surface covers one side of the opening of the outlet bore through the sloped wall and the remainder of the opening of the outlet bore through the sloped wall is open to fluid communication with the outlet bore, including a portion of the intersection of the outlet bore with the sloped wall at the outer circumference of the outlet bore; and
    an outlet fluidly coupled to the outlet bore.

2. The valve of claim 1, further comprising a first spring disposed between the cam and a wall of the cam bore, the spring biasing the cam to extend the lower angled surface across the entire opening of the outlet bore through the sloped wall.

3. The valve of claim 2, wherein the cam is disposed between the first spring and the first piston.

4. The valve of claim 2, wherein the cam is disposed between the first spring and the angled surface of the cam bore.

5. The valve of claim 2, further comprising a second spring extending between the cam and a wall of the cam bore.

6. The valve of claim 1, wherein the valve body further comprises a key extending inwardly of the reduced diameter bore, and the first piston includes a key slot extendable over the key.

7. The valve of claim 1, wherein:
    the first piston comprises a cam facing surface through which the piston passage opens into the cam bore; and
    the self-energizing seal comprises a second piston having an annular sealing surface selectively positionable with respect to the opening of the piston passage into the cam bore.

8. The valve of claim 7, wherein the cam is configured to move along the angled surface of the cam bore in response to an increase in pressure in the inlet bore; and
    movement of the cam along the angled surface causes movement of the annular sealing surface along the outlet facing surface of the first piston.

9. The valve of claim 1, wherein the cam and the first piston are slidingly interconnected.

10. A valve, comprising:
    a body;
    a first passage in fluid communication with a valve inlet;
    a second passage in fluid communication with a valve outlet;
    a cam located in a cammed ramp region of the valve body, the ramp region comprising a flat inclined surface extending from a first location adjacent to a side wall of the first passage to a second location within the first passage, the flat surface extending away from the inlet in the direction from the first location to the second location;
    the second passage intersecting and opening through the flat inclined surface; and
    the cam including a flat inclined sealing wall having an area greater than the area of the opening of the second passage into the flat inclined surface, the sealing wall including a forward edge;
    the cam positionable along the flat inclined surface of the cammed ramp between a first position where flow from the valve inlet is blocked between the valve inlet and valve outlet by the flat inclined sealing wall surrounding the opening of the second passage into the flat inclined surface, and a second position wherein flow is allowed between the valve inlet and valve outlet, wherein the flat inclined sealing wall of the cam is in contact with the flat inclined surface and the forward edge extends across the opening of the second passage into the flat inclined surface, the forward edge intersecting the perimeter of the opening of the of the second passage into the flat inclined surface at two locations.

11. The valve of claim 10, wherein the forward edge extends along a straight-line path.

12. The valve of claim 11, wherein the valve includes a centerline, and the second passage is disposed generally parallel to, and radially offset from, the centerline, and the ramp surface forms a non-orthogonal angle with respect to the centerline.

13. The valve of claim 11, wherein the cam is biased against the ramp surface.

14. The valve of claim 10, wherein:
    the cam includes a cam bore extending inwardly;
    a first piston is received in the bore; and
    a second piston faces the first piston, wherein a portion of the first piston contacts, and selectively seals against, a portion of the second piston.

15. The valve of claim 14, wherein:
    the cam bore a blind bore;
    the first piston includes a piston bore extending therein a fluidly communicable with the base of the blind bore.

16. The valve of claim 15, wherein the first piston is slideable in the cam, and also slideable with respect to the first piston.

\* \* \* \* \*